US006596354B1

(12) United States Patent
Longdon et al.

(10) Patent No.: US 6,596,354 B1
(45) Date of Patent: Jul. 22, 2003

(54) PLASTICS FILM, USE OF DYESTUFFS THEREIN AND PROCESS FOR TESTING THE AUTHENTICITY OF PACKAGED GOODS

(75) Inventors: Tony Longdon, Nuneaton (GB); Gwynneth Anne Heald, Derby (GB); Paul William Law, Kenilworth (GB)

(73) Assignee: Acordis Acetate Chemicals Limited, Spondon (GB)

( * ) Notice: Subject to any disclaimer, the term of this patent is extended or adjusted under 35 U.S.C. 154(b) by 0 days.

(21) Appl. No.: 09/743,821

(22) PCT Filed: Jul. 19, 1999

(86) PCT No.: PCT/GB99/02310

§ 371 (c)(1),
(2), (4) Date: Jan. 16, 2001

(87) PCT Pub. No.: WO00/05076

PCT Pub. Date: Feb. 3, 2000

(65) Prior Publication Data (65)

(30) Foreign Application Priority Data

Jul. 2, 1998 (GB) ............................. 9815808

(51) Int. Cl.⁷ .............................. B44F 1/10; A22C 1/30; A22C 17/10; B42D 15/00
(52) U.S. Cl. ....................... 428/29; 428/35.2; 428/35.7; 428/916; 426/87; 426/383; 426/415; 283/72; 283/95; 283/107; 206/807
(58) Field of Search ................ 428/156, 29, 207, 428/916, 35.2, 35.7, 500; 206/807; 283/70, 72, 95, 96, 97, 107; 426/87, 106, 383, 415

(56) References Cited

U.S. PATENT DOCUMENTS 4,136,229 A    1/1979  Godet
5,424,266 A    6/1995  Gundjian
5,476,830 A   12/1995  Gundjian
5,532,200 A    7/1996  Gundjian
5,595,590 A    1/1997  Belding
5,753,285 A  *  5/1998  Horan .................. 426/87

FOREIGN PATENT DOCUMENTS

| DE | 588565 | 11/1933 |
|----|--------|---------|
| EP | 802069 | 10/1997 |
| FR | 2365656 | 4/1978 |
| GB | 970960 | 9/1964 |
| GB | 1593172 | 7/1981 |
| WO | WO91/12139 A1 | 8/1991 |

OTHER PUBLICATIONS

WPI Abstract Accession No. 85–233262[38], Japanese Patent Application No. 60151578A, published Aug. 9, 1985 for "Colour–changing time * indicator*—prepared by adding migrating dye to synthetic resin e.g., polyurethane" (Abstract only).

WPI Abstract Accession No. 1978–44467A/197825, French Patent No. 2,365,656, published Apr. 21, 1978 for "Security Paper" (Abstract only—corresponds to document (AO) listed above).

* cited by examiner

Primary Examiner—Donald J. Loney
(74) Attorney, Agent, or Firm—Howson and Howson

(57) ABSTRACT

A dyestuff capable of undergoing a clearly visible colour change when contacted with a color-developing material is dispersed in the body of a plastics film and used in the identification of goods. The film can be used for packaging of the goods or as a label or seal affixed to the goods. When testing the authenticity of packaging goods, the plastics film is marked with the color-developing chemical to produce a colored mark on the package. The dyestuff is preferably a latent dyestuff which is colorless and invisible to the eye under ambient conditions for use of the film but which forms a clearly visible color when contacted with the color-developing material.

15 Claims, No Drawings

PLASTICS FILM, USE OF DYESTUFFS THEREIN AND PROCESS FOR TESTING THE AUTHENTICITY OF PACKAGED GOODS

FIELD OF THE INVENTION

This invention relates to plastics film useful for packaging or for lamination to paper or board to form packaging or promotional material and to the preparation and use of such film. In particular, it relates to plastics film useful for security packaging having a feature which is not apparent to the eye but which can readily be revealed in a test for authenticity. It also relates to the use in the identification of goods of dyestuffs capable of undergoing a clearly visible colour change when contacted with a colour-developing material and to a process for testing the authenticity of packaged goods.

BACKGROUND ART

Invisible inks have long been known and have been used or suggested for use in various covert marking procedures. For example, U.S. Pat. No. 5,424,266, U.S. Pat. No. 5,476,830 and U.S. Pat. No. 5,532,200 describe a latent image printing method and apparatus in which a substrate with one main surface has a covering comprising a dye defining a background colour. When the dye is mixed with a colour developer they produce a spectral response which is visible relative to the background colour. There is a continuous coating over the covering which is non-porous and solvent-resistant with respect to the colour developer. U.S. Pat. No. 5,421,809 and U.S. Pat. No. 5,516,362 describe a security marking method comprising marking a portion of a substrate by applying a first marking fluid which is invisible when illuminated by both visible light and ultraviolet light and activating the marked portion by applying a second marking fluid thereon. The second marking fluid is reactable with the first marking fluid to be invisible when illuminated by visible light and fluorescent when illuminated by ultraviolet light.

U.S. Pat. No. 5,595,590 describes a method for authenticating a document or article comprising applying a mixture of a carrier, a leuco dye and an activator to a surface of a document or article, wherein the leuco dye and activator react in response to a rubbing force applied to the surface so as to change colour.

GB-A-1593172 describes an apparatus for applying written or drawn information onto image carriers for overhead projectors, comprising an image carrier in film or plate form which includes at least one coloured compound, as well as a writing or drawing marker, the writing or drawing fluid of which contains at least one colourless compound. This colourless compound reacts with the coloured compound to produce a colour change.

DISCLOSURE OF THE INVENTION

We have found that a dyestuff capable of undergoing a clearly visible colour change when contacted with a colour-developing chemical is useful in the identification or authentication of goods when it is dispersed in the body of a plastics film.

The plastics film can be used in packaging goods, generally as the outermost layer of packaging over at least part of the surface area of the packaged goods or in a position such that it can easily be contacted by the colour-developing chemical. The plastics film can be used as a label or seal affixed to goods, for example a seal which has to be broken to open the package. The plastics film can be used as the outer(most) layer of laminated packaging.

The invention also includes a process for testing the authenticity of packaged goods, characterised in that the goods are packaged in packaging material including a plastics film having a dyestuff dispersed in the body of the plastics film, said dyestuff being capable of undergoing a clearly visible colour change when contacted with a colour-developing chemical, and the said plastics film is marked with the colour-developing chemical to produce a coloured mark on the package.

The invention also includes a plastics film having a dyestuff dispersed in the body of the plastics film, characterised in that the dyestuff is a latent dyestuff which is colourless and invisible to the eye under ambient conditions for use of the film but which forms a clearly visible colour when contacted with a colour-developing chemical.

The system of the present invention has the advantage over invisible ink security marking systems of being more difficult to replicate, and hence more secure, and also more durable whilst being just as easy to mark when testing for authenticity. The dyestuff is distributed throughout the film, which is a self-supporting film, rather than simply being printed on the surface, and access to the film can be restricted to reputable manufacturers, for example manufacturers of expensive branded luxury goods and products or compact discs or computer software. Film having an area printed with invisible ink is often detectable because a slight difference of gloss in the printed area is visible, whereas dispersion of the dyestuff in the body of the film in accordance with the invention does not indicate to a counterfeiter that the dyestuff acts as a security check.

The plastics film can for example be a cast film such as a cast cellulose acetate film or can be an extruded film such as a polyolefin film, for example polyethylene or polypropylene, or a polyester film, for example polyethylene terephthalate. The film can be a clear, matt or semi-matt film. The film can be crosslinked, for example crosslinked cellulose acetate film. The film can contain any of the additives known for incorporation in film, provided that these do not obscure the colour developed by the dyestuff and colour-developing chemical. Cellulose acetate film can for example contain a plasticiser, for example 10 to 25% by weight of a phthalate ester plasticiser such as diethyl phthalate. The thickness of the film is generally in the range 5 to 500 microns, more usually 10 or 15 microns up to 50 or 100 microns. For example, film for lamination over print, e.g. for lamination over paperboard packaging, may have a thickness of 10 to 25 or 40 microns and film for other uses such as labels and seals or for window packaging may have a thickness of 25 to 75 microns.

The dyestuff is preferably a latent dyestuff which is colourless and invisible to the eye under ambient conditions for use of the film but which forms a clearly visible colour when contacted with a colour-developing chemical. The film can thus appear as an ordinary transparent or translucent film in normal use. The dyestuff can alternatively form a coloured film under ambient conditions which is changed to colourless or to a different colour by the colour-developing chemical.

The dyestuff can for example be an acid/base indicator, preferably a latent dyestuff indicator which is inconspicuous at ambient pH for use of the film (usually neutral pH) but which develops colour on contact with strong acid or strong base. Phenolphthalein, for instance, is colourless at neutral pH but develops a vivid pink colour when marked with alkali, and thymolphthalein is colourless at neutral pH but develops a blue colour when marked with alkali. The colour development system is preferably reversible in most cases so that, after the coloured mark has been observed, the marked area can be contacted with a chemical which reacts with the dyestuff to change it back to its original colour, for example the colourless and invisible form of a latent dyestuff. As a result, the marked area is indistinguishable from the rest of the film. In other words, the packaged goods can be authenticated but then sold unmarked. Acid/base indicators are generally reversible. A pink mark on a film containing phenolphthalein will vanish when overmarked with an acid. The latent dyestuff can alternatively be a leuco dye. 4-Nitrophenol and 3-nitrophenol are examples of dyes which change colour on application of acid, being yellow at neutral pH and changing to olive or green at acidic pH. The dyestuff incorporated in the film can be a material sold commercially as a colour developer, with the corresponding coupler being applied as the colour-developing chemical of the invention. For example, the material sold as "Color Developer CD3" for use in coloured photographic film base, believed to be a salt of 3-methyl-N-(2-methylsulphonamido) ethyl-N-ethyl-p-phenylenediamine (CAS No 25646-71-3), can be incorporated in the film, with a coupler compound such as that sold as "Yellow Coupler 2", believed to be 2-[4'-(4-benzyloxyphenylsulphonyl)phenoxy]N-2'chloro-5'-[4-(2,5-di-tert amylphenoxy)butyramido]phenyl-2-pivaloyl acetamide (CAS No. 30744-85-5), applied as a colour-developing chemical in conjunction with an oxidising agent such as a peroxide. The yellow colour developed can be changed back to colourless by a reducing agent.

The invention includes a process for the preparation of a plastics film, in which a dyestuff capable of undergoing a clearly visible colour change when contacted with a colour-developing chemical, preferably a latent dyestuff as described above, is dispersed in a film-forming plastics material and the plastics material is then converted into film. The amount of dyestuff incorporated in the film is preferably at least 0.1 or 0.2% by weight up to 5 or 10% by weight, for example 0.5 to 2.0% by weight. The optimum amount of dyestuff varies according to the intensity of the dye in its colour-developed state.

Cast film is generally produced by casting a solution of film-forming plastics material onto an endless belt, which is a polished metal belt for producing clear film. Matt or semi-matt film can be produced by casting on a roughened belt or by embossing film with a roughened roller. The dyestuff is preferably included in the casting solution. It can in many cases be directly dissolved in the solution. Cellulose acetate film, for example, is cast from acetone solution, and many dyestuffs (including most latent dyestuffs) are acetone-soluble. Alternatively, a solution of the dyestuffs can be injected into the solution of plastics material before it is cast. The concentration of dyestuff in the solution injected is greater than the required concentration of dyestuff in the film and can for example be 5 to 75% by weight. The dyestuff solution is preferably a solution in the same solvent as that used in the plastics material solution, although a miscible solvent can alternatively be used. The solution of plastics material generally passes through a set of static mixers or baffles just before the casting bar, and the dyestuff solution can for example be injected just upstream of the static mixers.

The dyestuff can alternatively be added in liquid form, for example as a solution or dispersion, after casting, although it may be more difficult in this case to ensure that the latent dyestuff is dispersed throughout the body of the plastics film. The dyestuff solution can for example be added just after casting, while the cast plastics material solution is still liquid or contains a high residual level of casting solvent, or the cast film can be further softened by the surface application of additional casting solvent, either as the solvent in which the dyestuff is applied or as a liquid applied to the film before the dyestuff is applied. Solvent can for example be applied to the film by a lick roller, as described in EP-A-802069.

The film can alternatively be a melt-extruded film, in which case a dispersion of the dyestuff in the film-forming plastics material, which may for example be a polyolefin such as polyethylene or polypropylene, or a polyester such as polyethylene terephthalate, is melt-extruded as film. The dyestuff can be dispersed direct in the plastics melt or a solution of the dyestuff, for example in a plasticiser for the film, can be dispersed in the plastics melt, for example it can be injected into the mixing stage of the extruder.

The plastics film is particularly suitable for laminating over printed paperboard, for use in packaging. The laminated paperboard is generally used with the film as its outer layer. The plastics film can alternatively be used as a packaging material without lamination or as window film in a window packaging. The film can be used, whether or not laminated to a backing, as a label material, for example for pressure-sensitive labels and for seals.

The colour-developing chemical used to test for authenticity is preferably held in a pen, for example a fibre tip pen, for easy use. The colour-developing chemical is preferably used in solution in a solvent which does not damage the film. Where the colour development is reversible, the chemical for reversing colour is also preferably held in a second pen which can be applied over the area in which colour is developed. For example, if the film contains an acid/base indicator such as phenolphthalein, a first fibre tip pen contains an alkaline solution to develop colour and a second fibre tip pen contains an acid solution to remove colour.

The authentication process of the invention can be used in conjunction with other security features. For example, the film can have a regular embossed pattern of depth 0.5 to 10 microns and repeat distance 20 to 400 microns whose regularity is sufficient for it to be capable of giving rise to a diffraction pattern or, as described in EP-A-802069, is such that when the plastics film is rubbed it emits a noise of characteristic frequency. The film can have different levels of embossing in different areas of the film, for example different depths and/or different repeat distance of embossing, to form a characterising pattern such as the logo of the company whose products are packaged in the film. The logo can be more or less highly embossed than the rest of the film or can be an unembossed area surrounded by embossed film or vice versa. The colour developing process can be applied to tamper-evident film, for example to an embrittled film used for tamper-evident seals and labels such as crosslinked cellulose acetate film sold commercially under the Registered Trade Mark "Integuard". A hologram can be formed in the film containing a dyestuff by a conventional metallising and embossing process.

The invention is illustrated by the following Examples in which parts and percentages are by weight:

EXAMPLE 1

100 parts cellulose acetate, 20 parts diethyl phthalate and 20 parts phenolphthalein latent dyestuff were dissolved in acetone.

A solution of cellulose acetate and diethyl phthalate in acetone was degassed, passed through a set of static mixers and cast onto a polished stainless steel belt. The dyestuff-containing solution described above was injected into the cellulose acetate solution just upstream of the static mixers. After evaporation of solvent, the clear film produced was stripped from the belt and dried by passing it through a drying oven. The composition of the film produced was:

81.7% cellulose acetate 16.3% diethyl phthalate 2.0% phenolphthalein

The film was colourless.

A 0.033M aqueous solution of sodium hydroxide was mixed with an equal volume of acetone and charged to a fibre tip pen. When the film was marked with this solution, a vivid pink colour rapidly developed.

A 0.033M aqueous solution of hydrochloric acid was mixed with an equal volume of acetone. When this solution was applied to the pink-coloured mark, the coloured area rapidly decoloured.

EXAMPLE 2

The process of Example 1 was repeated using an equal weight of thymolphthalein in place of the phenolphthalein. The same results were observed, except that the colour observed on marking with sodium hydroxide solution was bright blue.

EXAMPLE 3

The process of Example 1 was repeated replacing half of the phenolphthalein by an equal weight of thymolphthalein. The same results were observed, except that the colour observed on marking with alkali solution was lilac.

In both Examples 2 and 3, the colour developed decoloured rapidly on treatment with the acidic solution.

EXAMPLE 4

100 parts cellulose acetate, 20 parts diethyl phthalate and 20 parts of the photographic film chemical "Color Developer CD3" were dissolved in acetone.

Film was cast and dried using the process described in Example 1, but injecting only half the amount of dyestuff-containing solution, so that the composition of the film produced was 82.5% cellulose acetate 16.5% diethyl phthalate 1.0% "Color Developer CD3"

The film was colourless.

The photographic film chemical "Yellow Coupler 2" was dissolved at 1% in an aqueous acetone solution of hydrogen peroxide buffered to pH9. When the film was marked with this solution, a bright yellow colour rapidly developed.

What is claimed is:

1. A process for testing the authenticity of packaged goods, comprising the steps of:

packaging the goods in packaging material including an outer layer of plastics film over at least a part of a surface area of the packaged good, the plastics film having a dyestuff dispersed in the body of the plastics film, said dyestuff undergoing a clearly visible colour change when contacted with a colour-developing chemical, and applying to the outer layer of the packaging material, which is comprised of the plastics film, said colour-developing chemical to produce a coloured marked area thereon to authenticate the packaged good.

2. The process according to claim 1, wherein the said plastics film forms the outermost layer of laminated packaging material.

3. The process according to claim 1, wherein the plastics film forms a seal which has to be broken to open the package.

4. The process according to claim 1, further comprising the step of contacting said marked area with a chemical which reacts with the dyestuff to change said marked area back to its original colour so that the marked area is indistinguishable from the rest of the film.

5. The process according to claim 1, wherein the dyestuff dispersed in the body of the plastics film is a latent dyestuff which is colourless and invisible to the eye under ambient conditions for use of the film.

6. A plastics film and marker combination for identifying packaged goods to which the plastics film is applied over at least a part of a surface area of the packaged good, comprising:

a plastics film having a dyestuff dispersed in a body of the plastics film, the dyestuff undergoing a clearly visible colour change when contacted with a colour-developing chemical, and means for marking the plastics film with said colour-developing chemical to authenticate the identification of the packaged good.

7. The plastics film and marker combination according to claim 6, wherein the dyestuff dispersed in the body of the plastics film is a latent dyestuff which is colourless and invisible to the eye under ambient conditions for use of the film.

8. The plastics film and marker combination according to claim 6, wherein the plastics film is an outer layer of a packaging material for packaging goods.

9. The plastics film and marker combination according to claim 6, wherein the plastics film is an outer layer of a laminated packaging material for packaging goods.

10. The plastics film and marker combination according to claim 6, wherein the plastics film comprises a seal for packaged goods.

11. The plastics film and marker combination according to claim 6, wherein the plastics film is a label for packaged goods.

12. The plastics film and marker combination according to claim 6, wherein the colour-developing chemical used to mark the plastics film is in solution in a solvent which does not damage the plastics film.

13. The plastics film and marker combination according to claim 12, wherein said means for marking is a marker pen.

14. The plastics film and marker combination according to claim 13, wherein said marker pen is a fibre-tipped pen.

15. The plastics film and marker combination according to claim 6, further comprising means for contacting a marked area of the plastic film with a chemical which reacts with the dyestuff to change the marked area back to its original colour so that the marked area is distinguishable from the rest of the plastics film.

* * * * *

UNITED STATES PATENT AND TRADEMARK OFFICE
CERTIFICATE OF CORRECTION

PATENT NO. : 6,596,354 B1
DATED : July 22, 2003
INVENTOR(S) : Longdon et al.

It is certified that error appears in the above-identified patent and that said Letters Patent is hereby corrected as shown below:

Column 3,
Line 28, "phenoxy]N-2" should read -- phenoxy]-N-2 --.

Column 6,
Line 62, "is distinguishable" should read -- is indistinguishable --.

Signed and Sealed this

Seventh Day of October, 2003

JAMES E. ROGAN
*Director of the United States Patent and Trademark Office*